United States Patent [19]
Schmidt

[11] Patent Number: 5,893,609
[45] Date of Patent: Apr. 13, 1999

[54] AIR PUMPING SYSTEM FOR AN AUTOMOTIVE SEAT

[75] Inventor: Howard J. Schmidt, Nashua, N.H.

[73] Assignee: McCord Winn Textron Inc., Manchester, N.H.

[21] Appl. No.: 08/880,146

[22] Filed: Jun. 20, 1997

[51] Int. Cl.[6] .................................................. A47C 4/54
[52] U.S. Cl. ........................ 297/284.6; 297/DIG. 3
[58] Field of Search ........................ 297/284.4, 284.6, 297/DIG. 3; 137/596

[56] References Cited

U.S. PATENT DOCUMENTS

| | | | |
|---|---|---|---|
| 4,167,200 | 9/1979 | Bouteille | 137/596 |
| 4,792,186 | 12/1988 | Benjamin et al. | 297/284.6 |
| 5,152,579 | 10/1992 | Bishai | 297/284.6 |

Primary Examiner—Peter M. Cuomo
Assistant Examiner—Anthony D. Barfield
Attorney, Agent, or Firm—Reising, Ethington, Barnes, Kisselle, Learman & McCulloch PC

[57] ABSTRACT

An inflatable lumbar support system for a vehicle seat includes an inflatable air cell, or cells, coupled by an air line to a motorized diaphragm pump. The outlet valve of the pump is in the form of an umbrella valve which serves not only to seal the pump on the intake strokes, but is of such character to provide the sole seal between the air cell and pump, thereby eliminating the need to have a separate external check valve between the pump and air cell to assure that the air cell does not leak once pressurized.

13 Claims, 4 Drawing Sheets

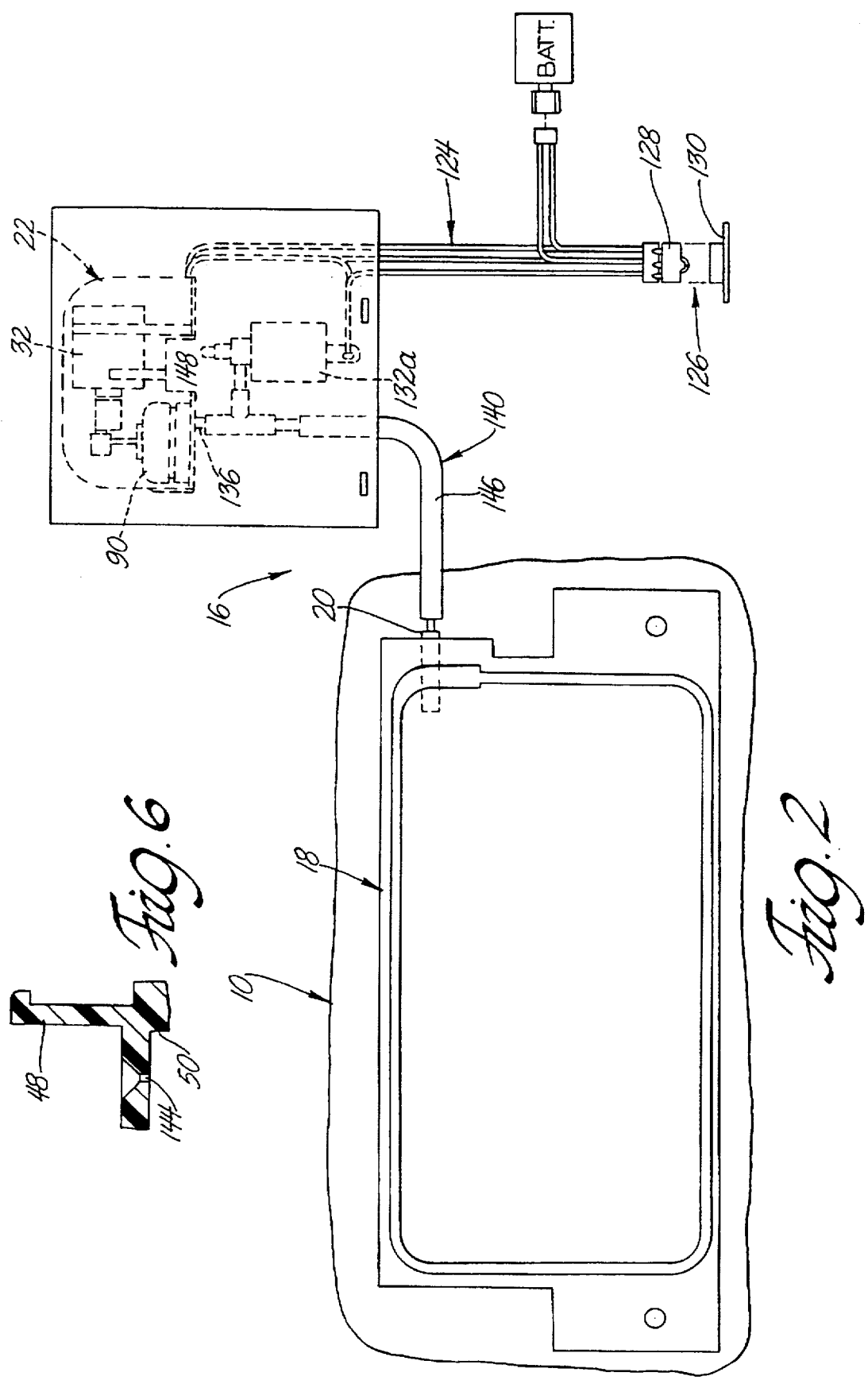

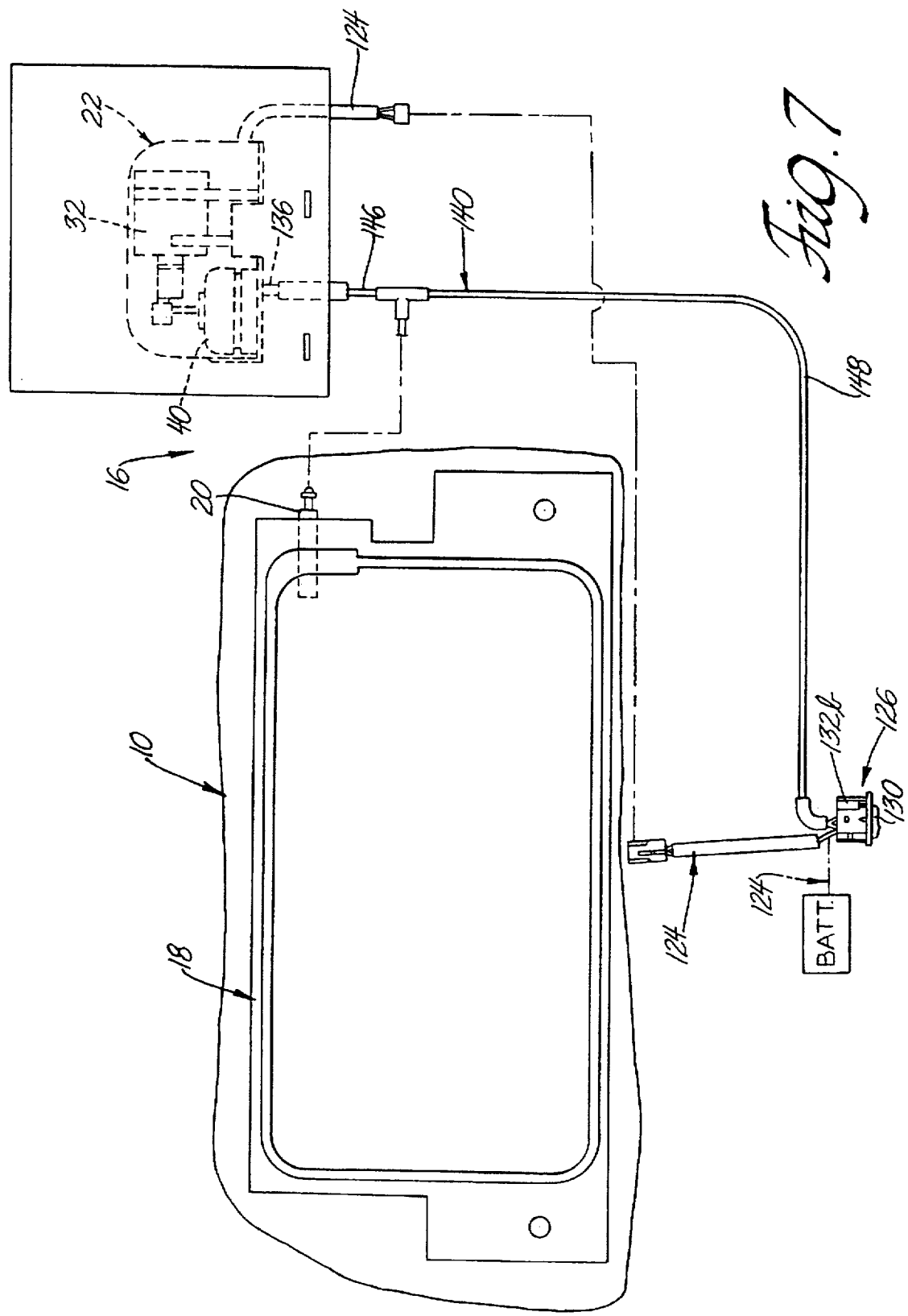

AIR PUMPING SYSTEM FOR AN AUTOMOTIVE SEAT

This invention relates generally to power inflatable air cell pumping systems for vehicle seats and, more particularly, to the valve arrangement used to retain the cell air tight.

BACKGROUND OF THE INVENTION

Some models of automotive vehicle seats are equipped with a pneumatic lumbar support system which includes provision of one or more inflatable air cells located in the lower region of the back rest and an electric air pump which, under the control of an operator switch, delivers low pressure air to the cell. Such systems enable an occupant of a seat to adjust the firmness or contour to meet his or her personal preference. Air cells may also be provided in other regions of the seat, such as the side bolster areas.

It is recognized that the cell, once inflated, must remain air-tight and not leak, since a change in air pressure within the cell would produce a corresponding objectionable change in the support provided to the occupant.

A source for air loss is the back flow of air from the cell through a non-reversible air pump, often the reciprocating piston type. One common valve used at the outlet of such pumps is a flapper-type valve which has sufficient sealing capability for the operation of a pump, but by its nature is not entirely leak proof and thus is unable to completely seal the air cell against air loss back through the pump. Consequently, it is common practice to install an external one-way check valve or solenoid valve in line between the outlet pump and the air cell to prevent such back flow through the pump. Such external valves, however, add to the cost and complexity of the system.

The present invention overcomes or greatly diminishes the foregoing objections.

SUMMARY OF THE INVENTION

An air adjustable seat system for an automotive vehicle comprises a seat having seat and back rest portions and an inflatable air cell, or cells, mounted within the seat. A low pressure non-reversible air pump is provided having an internal working chamber with an air inlet and an air outlet and a reciprocating diaphragm member driven by an electric motor within the chamber between an intake stroke and an outtake stroke. The inlet and outlet openings are fitted with valves that cooperate to allow air to be drawn into the chamber through the inlet opening on the intake stroke and exhaust air from the chamber through the outlet on the exhaust stroke.

The outlet of the pump communicates with the air cell of the system via a conduit.

The outlet valve of the pump is in the form of an umbrella valve having a resilient sealing disc and central stem. The stem urges the sealing disc resiliently against a cooperating sealing surface of the pump in overlying relation to the outlet. The umbrella valve serves both to seal the outlet during the intake of air into the working chamber through the inlet on the intake stroke and, also, as an air-tight seal when the pump is inoperative to prevent the back flow of air from the air cell through the pump.

The umbrella valve thus serves two functions and eliminates the need for an external check valve or solenoid valve normally provided in line between the pump and air cell, reducing the number of component parts and simplifying the operation of the pumping system.

THE DRAWINGS

These and other objects and advantages will be more readily apparent when considered in connection with the following description and accompanying drawings, wherein:

FIG. 2 is a diagrammatic view of a first presently preferred embodiment of the air pumping system of the invention;

FIG. 6 is an enlarged fragmentary sectional view taken along lines 6—6 of FIG. 4; and FIG. 7 is a diagrammatic view of another embodiment of a pumping system according to the invention.

DETAILED DESCRIPTION

Figure 1:
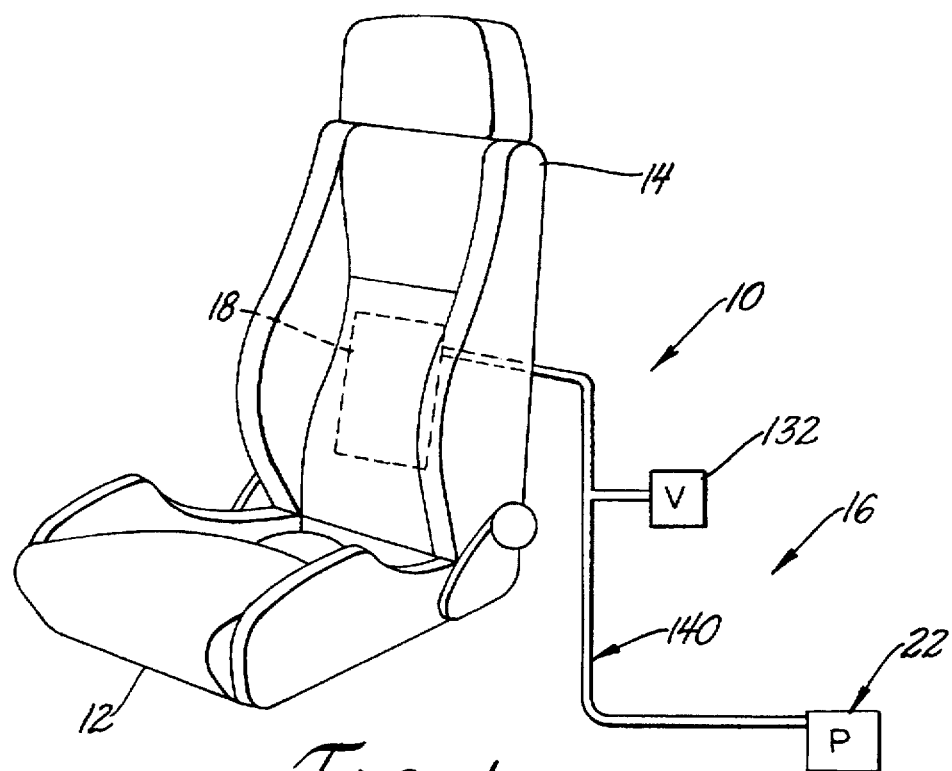
FIG. 1 is a perspective view of a vehicle seat embodying the invention.

Referring now in greater detail to the drawings, FIG. 1 illustrates an automotive vehicle seat 10 having a generally horizontal seat portion 12 and a back rest portion 14 extending generally upwardly from the seat portion 12 to provide support for an occupant in a seated position thereon. The seat 10 includes a pumping system 16 for adjusting the contour and firmness of the seat in accordance with the personal preference of the occupant.

An inflatable air cell 18 of the pumping system is mounted within the seat 10, preferably in the lower lumbar region of the back rest portion 14 and includes an air fitting 20 (FIG. 2) providing an opening into the interior of the air cell 18. While a single air cell system is shown in the drawings for purposes of illustration, it is understood that the invention contemplates within its scope seating systems employing multiple air cells in the same or different locations of the seat (e.g., the lumbar region, bolster region, etc.).

Figure 3:
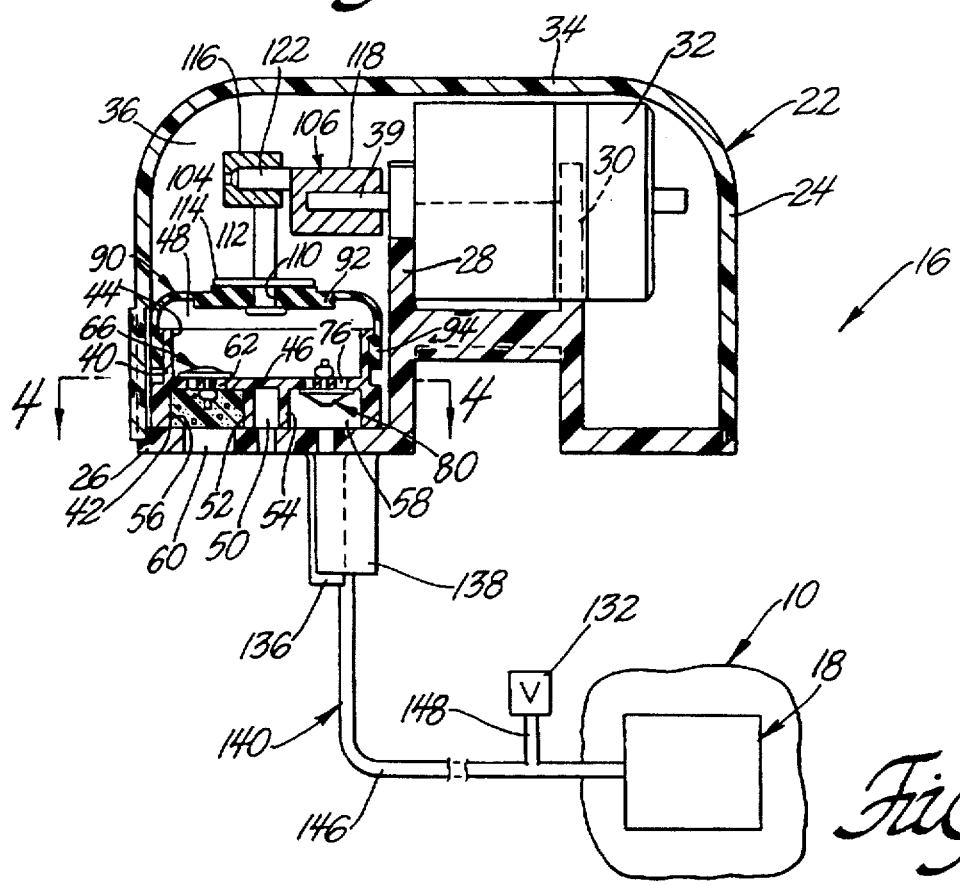
FIG. 3 is an enlarged cross-sectional view of the system.

As shown best in FIG. 3, the system includes a non-reversible low pressure diaphragm pump 22 for supplying air under low pressure (i.e., under 5 p.s.i.) to the air cell 18. The pump 22 has a rigid casing or pump body 24 fabricated preferably of molded plastics material such as ABS. The body 24 includes a base portion 26 formed with a pair of U-shaped uprights 28, 30 that cradle an electric motor 32. A cover 34 is attached to the base 26 and retains the motor 32 in position on the uprights 28, 30 and encloses a compartment 36 adjacent the motor 32 into which a rotary shaft 39 of the motor 32 extends.

A rigid manifold portion 38 is housed in the compartment 36 and includes a continuous upstanding peripheral wall 40, that is generally cylindrical having opposite open ends 42, 44, the lower end of which is joined to the base 26 in such manner as to provide an air-tight seal therebetween. An integrally formed partition wall 46 divides the interior of the manifold into an upper working chamber 48 and a lower chamber 50. The lower chamber 50 is further divided by adjacent intake and exhaust cavity walls 52, 54 extending in sealed relation between the intermediate partition wall 46 at their upper ends and the base portion 26 at their lower ends. The walls 52, 54 thus isolate corresponding intake and exhaust cavities 56, 58 from the remainder of the lower chamber 50.

Figure 4:
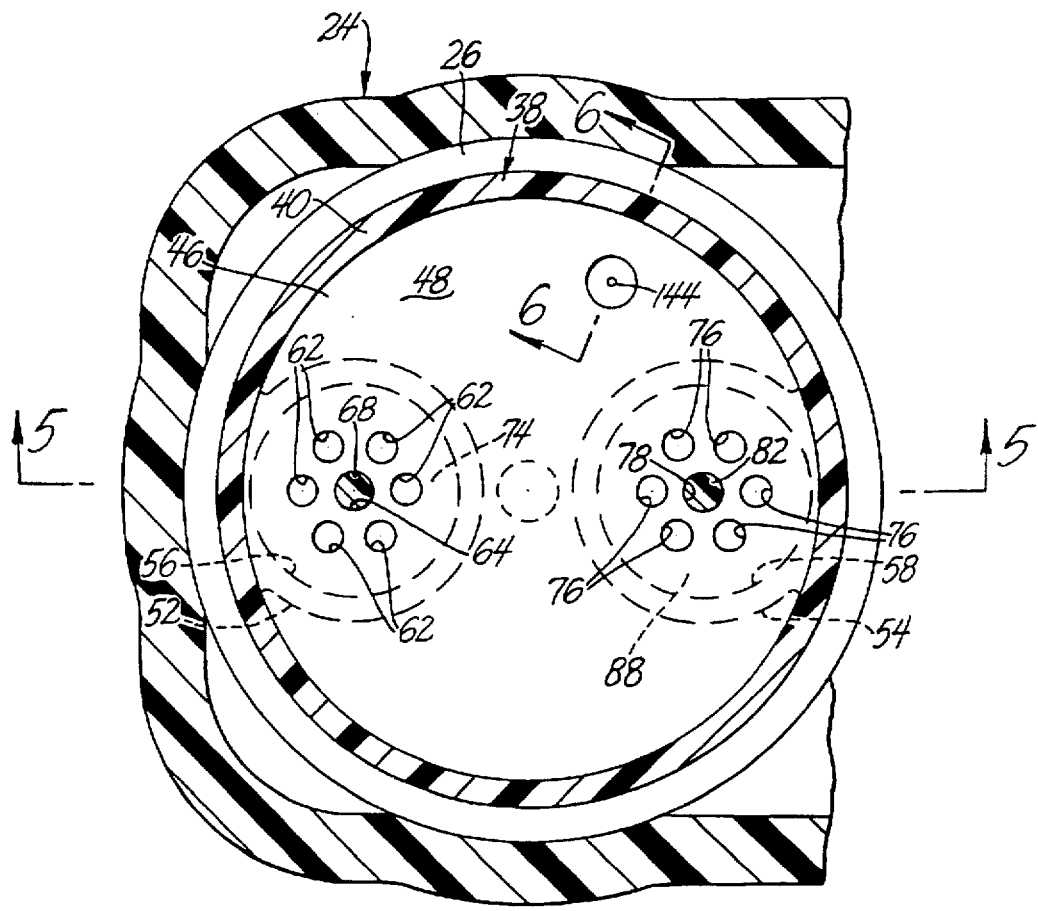
FIG. 4 is an enlarged fragmentary cross-sectional plan view taken along lines 4—4 of FIG. 3.

An opening 60 is formed in the base portion 26 providing open flow communication between the intake cavity 56 and the atmosphere external to the pump body 24. The partition 46 of the manifold 38 is formed with a plurality of air inlet openings 62 arranged concentrically about a central mounting hole 64 (FIG. 4) providing air flow communication between the intake cavity 56 on one side of the partition wall 46, and the working chamber 48 on the other side.

An inlet umbrella valve 66 is secured within the mounting hole 64 of the partition wall 46 to selectively open and close the inlet openings 62 and thereby control the introduction of air into the working chamber 48. As shown best in FIG. 5, the valve 66 comprises a generally T-shaped one piece member fabricated of a resilient, pliable material such as rubber or plastics, and preferably silicone. The valve 66 has a stem 68 that projects through the central mounting hole 64 and is formed at its end with an enlarged locking head or bulb 70. The head 70 is deformable, allowing it to be pulled through the mounting hole 64. Upon exiting the hole 64, the head 70 returns to its enlarged state to confront the edge of the hole 64 on the inlet cavity side of the partition wall 40.

An integrally formed annular sealing disc 72 is located at the other end of the stem 68 within the working chamber 48 and extends radially outwardly in all directions from the stem 68 across the working chamber side of the partition wall 40 to a peripheral outer edge radially beyond the outwardly of the inlet openings 62. The length of the stem 68 between the head 70 and underside of the disc 72 is slightly less than the thickness of the partition wall 46, such that the stem is placed under constant tension, resiliently urging the flexible disc portion 72 releasably against an abutting underlying sealing surface 74 of the partition wall 46, sealing off the inlet openings 62.

The partition wall 40 further has a plurality of outlet openings 76 arranged circumferentially about a central mounting hole 78, like those of the inlet openings 62, to provide air flow communication between the working chamber 48 and the exhaust cavity 54. An outlet umbrella valve 80 identical in construction to that of inlet valve 66 is secured by its stem 82 within the mounting hole 78, such that the enlarged head 86 at one end of the stem 82 projects into the working chamber 48 and the sealing disc 84 at the other end is accommodated in the exhaust cavity 58 (the reverse of that of the inlet valve 66). The sealing disc 84 is urged resiliently into releasable sealed engagement against and underlying sealing surface 88 of the partition wall 46 on the exhaust cavity side of the wall 46, closing off the outlet openings 76.

The pump 22 includes a flexible diaphragm 90 (FIG. 3) that is mounted on the manifold 38 and forms a moveable wall of the working chamber 48. The diaphragm 90 is molded from a soft, resilient material, such as natural rubber, and has a generally planar wall 92 that extends continuously across the upper end 44 of the manifold 38. An integrally formed peripheral flange 94 of the diaphragm 90 extends transversely from the wall 92 and encircles the outer wall or mouth 96 of the manifold 38. The flange 94 has an inner annular rib 98 that interlocks with a corresponding external recess or step 102 of the manifold 38 to secure the diaphragm 90 in position on the manifold 38 and provide an air-tight seal therebetween.

The wall 92 of the diaphragm 90 is coupled by a rigid linkage 104 to an eccentric crank 106 mounted on the rotary shaft 39 of the motor 32 for driving the wall 92 of the diaphragm 90 with reciprocating to and fro motion relative to the manifold 38 to define chamber-expanding intake and chamber-contracting exhaust strokes of the diaphragm 90. One end of the linkage 104 extends through a central aperture 110 of the diaphragm wall 92 and is formed with a pair of axially spaced locking heads 112, 114, which engage the wall 92 on opposite sides of the aperture 110 to secure the linkage 104 axially relative to the diaphragm 90. The other end of the linkage 104 is formed with a journal 116.

The crank 106 has a cylindrical collar portion 118 mounted concentrically about the shaft 39 and an axially offset wrist pin 122 projecting from the collar 118 and received in the journal 116 to couple the crank 106 and linkage 104.

The motor 32 is coupled to the vehicle's battery (not shown) by lead wires 124 through an electrical switch 126 (FIG. 2). The switch 126 includes a switch body or housing 128 adapted for mounting within the vehicle's interior compartment at a location accessible and convenient to the operator, such as, for example, the vehicle's door panel or center console. The housing 128 supports a control pad or button 130 that is biased by a spring (not shown) in the usual manner to a neutral or "OFF" position to interrupt power from the battery to the pumping system 16. In the present example, the control pad 130 comprises a rocker element that is able to be depressed by the operator in order to move the element 130 from the initial neutral position to one of two control positions, the first of which closes the electrical circuit between the battery and motor, and the second of which operates a bleed valve 132 to be described below.

Figure 5:
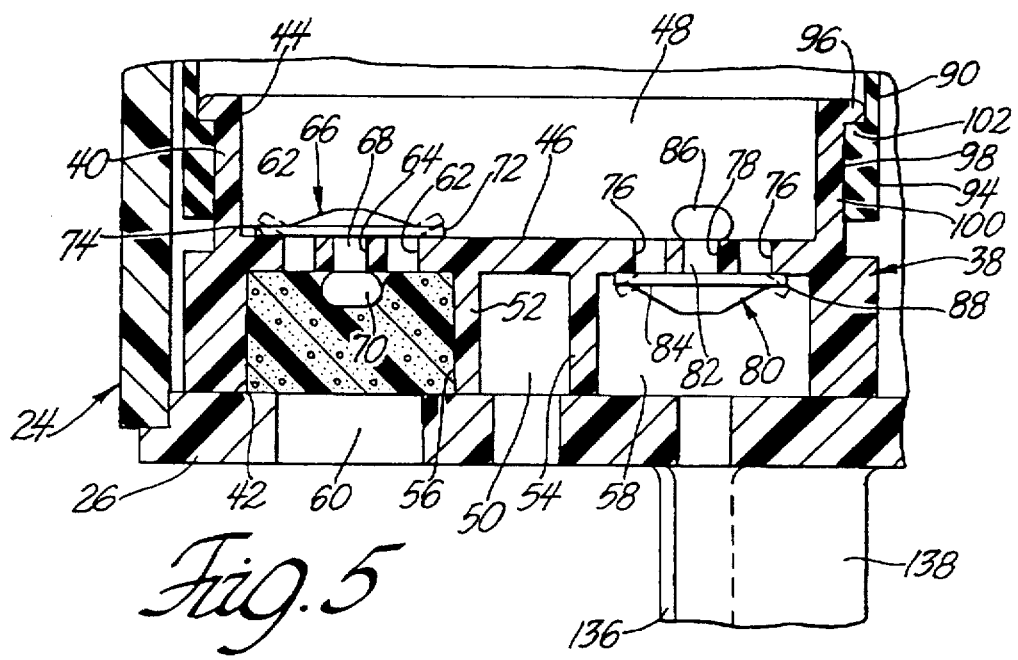
FIG. 5 is a fragmentary sectional view taken along lines 5—5 of FIG. 4.

Referring more specifically to FIGS. 3 and 5, energizing the motor 32 by moving the switch element 130 to the first position causes the shaft 39 to rotate, which in turn rotates the crank 106. The eccentric wrist pin 122 of the crank 106 transmits the rotary motion of the crank 106 into axial reciprocating displacement of the linkage 104, which in turn moves the wall 92 of the diaphragm 90 axially to and fro relative to the manifold 38 between the air intake and exhaust strokes.

On each intake stroke, air is drawn into the working chamber 48 past the inlet valve 66 through the openings 62. A filter 134 is accommodated within the intake cavity 56 to cleanse the intake air of impurities. The sealing disk 84 of the outlet umbrella valve 80 remains sealed on the intake stroke to prevent air from being drawn in to the chamber 48 through the outlet openings 76.

On each exhaust stroke of the diaphragm 90, the inlet valve 66 closes causing the air within the chamber 48 to compress and exhert opening pressure on the outlet valve 80. The increase in air pressure flexes the peripheral edges of the sealing disc 84 of the outlet umbrella valve 80 out of sealed engagement with the wall 40, allowing the compressed air to exhaust from the chamber 48 through the air outlet openings 76.

A tubular connector 136 projects from the base 26 of the pump body 24 and is in open flow communication with the exhaust cavity 58 (FIG. 3). An upstanding shroud or a guard 138 extends alongside the connector 136 to protect it from damage during handling and shipping. A flexible air line or conduit 140 is coupled at one end to the connector 136 and connected at its opposite end to the inlet fitting of the air cell 18. Air expelled from the pump 22 on each exhaust stroke is routed directly into the interior of the air cell 18 through the airline 140. Operation of the pump 22 continues until the desired air pressure and thus a corresponding seat contour is achieved (typically in the range of about 1–3 p.s.i., with the pressures of up to 5 p.s.i. contemplated).

When the desired air cell pressure is attained, the operator simply releases the control pad 130 which self-returns under spring force to the "OFF" position to interrupt the flow of power to the pump 22. Halting operation of the pump 22 stops the flow of exhaust air which, in turn, causes the outlet umbrella valve 80 to close, thereby sealing the air cell 18 against air leakage back through the pump 22.

The quality of the seal that enables the outlet valve 80 to function without the assistance of an additional in-line check valve as is customary for sealing the air cell 18, is due in substantial part to its umbrella valve construction and also to the nature of the contacting surfaces of the sealing disc 84 and the underlying base wall 26. The sealing disc 84 is essentially defect-free, such that there are no burrs, deformities, or other imperfections that would provide other than a smooth, planar sealing surface. The corresponding contacting valve seat surface 142 of the base wall 26 (FIG. 5) is likewise smooth and planar to provide full intimate ceiling contact between the disc 84 and the valve seat 142. The valve seat surface 142 of the base wall 26 is polished in a post-molding operation to a SPI A-2 finish. This assures that air does not leak from the air cell 18 back to the pump 22, thereby dispensing with the need for an in-line check valve.

Once the pump 22 has been stopped, further pressurization of the cell 18 may be achieved by simply activating the control pad 130 to operate the pump 22 as before. The pump 22 is advantageously fitted with a small amperage hobby-type motor 32 in order to minimize the size, weight, and energy requirement of the system 16. An electric pump that draws about 500 milliamps is preferred, which is considerably less than that typically employed in the industry for lumbar seating systems which draw about 2½ amps. Because of its small size, however, the motor 32 may have some difficulty unseating the disc 84 of the outlet valve 80 due to the back pressure acting on the disc from the air cell 18. The greatest difficulty is encountered when the pump 22 commences operation near the end of its exhaust stroke. To alleviate the problem and accommodate the small amperage motor 32, it is preferred that a small breather hole 144 be formed in the pump body 24 venting the working chamber 48 to atmosphere. The hole 144 is extremely small (on the order of about 0.012 inches in diameter) and as such has little impact on the normal pumping operation of the pump 22. However, during the initial startup, any pressure that builds in the working chamber 48 by an incomplete exhaust stroke that is insufficient to crack the outlet valve 80 is able to be vented to atmosphere through the hole 144. The diaphragm 90 may then complete a full intake stroke followed by a full exhaust stroke in order to generate sufficient momentum and pressure to unseat the outlet valve 80.

When it is desired to relieve the air cell 18 of the air pressure, the operator simply moves the control pad 130 to the second position to actuate the bleed valve 132. As illustrated in the two embodiments of FIGS. 1 and 7, the air line 140 has a main section 146 extending between the pump 22 and air cell 18, and a branched section 148 off the main section 146 closed at its end by the bleed valve 132. In the first embodiment of FIG. 1, the bleed valve comprises a solenoid valve 132a that is wired to the switch 126 and maintained normally in the closed position until the control pad 130 is moved to the second position. FIG. 5 shows an alternative bleed valve arrangement comprising a mechanical relief valve 132b, such as a Schrader-type valve, preferably incorporated into the construction of the switch 126. Rocking the control pad 130 to the second position acts to unseat an axially movable stem of the valve and thereby open the air line to atmosphere. Releasing the control pad 132 allows the stem, which is spring-biased to the closed position, to reseat itself to seal the air line.

The disclosed embodiments are representative of presently preferred forms of the invention, and are intended to be illustrative rather than definitive thereof. The invention is defined in the claims.

I claim:

1. A power inflatable seating support adjust system for a vehicle comprising:

a seat having a generally horizontal seat portion and a back portion extending upwardly from said seat portion to provide support to an occupant in a seated position thereon;

at least one inflatable air cell mounted within said seat having an opening therein to admit air into and out of said air cell; and a diaphragm pump having (a) a pump body with a working chamber, (b) a flexible diaphragm forming a movable wall of said chamber, (c) said chamber having two openings comprising an air inlet and an air outlet, (d) associated inlet and outlet valves normally closing said air inlet and said air outlet but operable to admit and exhaust air, respectively, from said chamber, (e) a motor coupled to said diaphragm and operative for driving said diaphragm between an air intake stroke in which air is drawn into said chamber through said air inlet and an exhaust stroke in which the air within said chamber is exhausted therefrom through said air outlet, (f) an air line coupling said air outlet of said pump to said opening of said air cell to direct the air exhausted from said pump into said air cell, and (g) wherein said outlet valve of said pump comprises an umbrella valve operative to open said air outlet to permit the flow of exhaust air from said pump to said air cell while closing said air outlet during said intake stroke of said diaphragm and when said motor is inoperative in order to seal said air cell at all times against air leakage back through said pump.

2. The system of claim 1 wherein said umbrella outlet valve is in direct open communication via said air line with an interior of said air cell and provides the sole valve within said system for sealing said air cell against leakage back through said pump.

3. The system of claim 1 wherein said umbrella outlet valve comprises a flexible sealing disc portion and an integral flexible stem portion projecting centrally from said sealing disc portion.

4. The system of claim 3 including a valve seat underlying said sealing disc portion of said umbrella valve, said valve seat comprising a planar region surrounding said outlet opening and polished to a surface finish of about SPE/SPI A-4 as of Jun. 20, 1997.

5. The system of claim 3 wherein said pump body has a valve seat portion in contact with said sealing disc portion of said outlet valve, said valve seat portion being polished to SPI A-2 as of Jun. 20, 1997.

6. The system of claim 3 wherein said pump body includes a manifold having an interior and a generally cylindrical side wall closed at one end by said diaphragm and united at its opposite end to a base wall of said pump body, said manifold including an intermediate transverse partition wall dividing said interior of said manifold into said working chamber and an adjacent lower chamber, said adjacent lower chamber being further divided by air inlet and outlet partition walls each isolating a corresponding air inlet cavity and air outlet cavity, said air inlet cavity being in open communication with atmosphere and housing an air filter therein, said air outlet cavity being in open flow communication with said air line and housing said sealing disc portion of said outlet valve.

7. The system of claim 1 wherein said motor comprises a small electric motor drawing about 0.5 amps when operational.

8. The system of claim 1 wherein said pump body includes a breather hole in continuous open flow communication with atmosphere.

9. The system of claim 8 wherein said breather hole has a diameter of about 0.012 inches.

10. The system of claim 1 wherein said air line includes a branched portion in open flow communication with said opening of said air cell.

11. The system of claim 10 including a bleed valve coupled to said branched portion and normally closed but movable to an open position to vent said air cell of air.

12. The system of claim 11 including a switch operatively coupled to said motor and said bleed valve for selectively actuating said motor and said bleed valve.

13. The system of claim 1 including an eccentric crank linking said diaphragm to said motor.

* * * * *